United States Patent
Ayers et al.

(10) Patent No.: US 6,592,905 B1
(45) Date of Patent: Jul. 15, 2003

(54) PRODUCTION OF AN IMMUNOGLOBULIN ENRICHED FRACTION FROM WHEY PROTEIN SOLUTIONS

(75) Inventors: John Stephen Ayers, Palmerston North (NZ); David Francis Elgar, Palmerston North (NZ); Mark Pritchard, Palmerston North (NZ)

(73) Assignees: Massey University, Palmerston North (NZ); New Zealand Dairy Board, Wellington (NZ)

(*) Notice: Subject to any disclaimer, the term of this patent is extended or adjusted under 35 U.S.C. 154(b) by 0 days.

(21) Appl. No.: 09/117,631

(22) PCT Filed: Jan. 31, 1997

(86) PCT No.: PCT/NZ97/00009

§ 371 (c)(1),
(2), (4) Date: Nov. 16, 1998

(87) PCT Pub. No.: WO97/27757

PCT Pub. Date: Aug. 7, 1997

(30) Foreign Application Priority Data

Jan. 31, 1996 (NZ) .................................................. 280916

(51) Int. Cl.[7] .......................... A61K 35/20; A23L 1/00; C07K 1/00
(52) U.S. Cl. ...................... 424/535; 530/414; 530/416
(58) Field of Search .................. 424/535; 530/414, 530/416

(56) References Cited

U.S. PATENT DOCUMENTS

| | | |
|---|---|---|
| 4,582,580 A | 4/1986 | Goudal et al. |
| 4,834,994 A | 5/1989 | Kuwata et al. |
| 5,179,197 A * | 1/1993 | Uchida et al. |
| 5,278,288 A | 1/1994 | Kawasaki et al. |

FOREIGN PATENT DOCUMENTS

| | | |
|---|---|---|
| AU | 620361 | 6/1989 |
| NZ | 237452 | 3/1991 |
| WO | WO 89/10064 | 2/1989 |

OTHER PUBLICATIONS

Hydrophobic Interaction Chromotography, Pharmacia Chapter 2 & p. 31, 1993.*
Xu et al. J of Chromotography 828:357–364, 1998.*
"Preparation of High Purity Protein by the Spherosil Process", Technical Data Bulletin CF–G–9–41–3 on Spherosil porous silica with ion–exchanger properties from *Rhone Poulenc Industries,* 1979.

* cited by examiner

*Primary Examiner*—Christina Chan
*Assistant Examiner*—Michail A Belyavskyi
(74) *Attorney, Agent, or Firm*—Knobbe, Martens, Olson & Bear, LLP

(57) ABSTRACT

This invention is directed to a process for producing an immunoglobulin enriched whey protein fraction from whey protein solutions. More particularly, it relates to the production of a whey protein fraction enriched in immunoglobulin, and optionally a whey protein isolate, using a cation exchanger under selected conditions. The selected conditions require overloading the cation exchanger with potentially absorbable protein which causes the exchanger to adsorb preferentially whey proteins other than immunoglobulin. The invention is also directed to the products produced by the process of the invention.

17 Claims, 2 Drawing Sheets

PRODUCTION OF AN IMMUNOGLOBULIN ENRICHED FRACTION FROM WHEY PROTEIN SOLUTIONS

FIELD OF THE INVENTION

This invention relates to a process for producing an immunoglobulin enriched whey protein fraction from whey protein solutions. More particularly, it relates to the production of a whey protein fraction enriched in immunoglobulins, and optionally a whey protein isolate, using a cation exchanger under selected conditions.

BACKGROUND OF THE INVENTION

Methods for isolating and purifying immunoglobulins from source materials are well known in the art. For example, physical methods of separating immunoglobulins from serum are known. Separation may be effected based on physical properties such as molecular weight, isoelectric point, electrophoretic mobility and solubility in various systems.

It is recognised that milk products contain, among other things, a mixture of different proteins including immunoglobulin. A process for producing immunoglobulin enriched milk products, and particularly the whey left from cheese and casein making, is commercially desirable. Many methods are known whereby whey proteins can be recovered from whey by ion exchange either as mixtures of proteins or a particular protein selected in preference to others.

Whether or not particular protein binds to an ion exchanger depends on a large number of parameters including the isoelectric point (IEP) of that protein, the pH of the protein solution and especially the choice of ion exchanger. A protein which binds to a cation exchanger at a particular pH will not usually bind to an anion exchanger at the same pH. These effects are well known to those skilled in the art and are summarised in Table 1 for the major whey proteins. It will be appreciated that this is an approximate guide to the behaviour of whey proteins on ion exchangers as there are also other factors which influence this behaviour. Furthermore, the information in the art has largely been determined empirically.

TABLE 1

Conditions for Adsorption of Whey Proteins by Ion Exchangers

| Protein | IEP | Cation Exchangers | | Anion Exchangers | |
| --- | --- | --- | --- | --- | --- |
| | | pH 3–5 | pH 5–7 | pH 3–5 | pH 5–7 |
| Ig | 6–8 | Yes | Yes | No | No |
| α-LA, β-LG, BSA | ≈5 | Yes | No | No | Yes |
| GMP | ≤4 | No | No | Yes | Yes |

Immunoglobulin (Ig), α-Lactalbumin (α-LA), β-Lactoglobulin (β-LG), Bovine serum albumin (BSA), Glycomacropeptide (GMP present only in sweet wheys).

Given the isoelectric point of immunoglobulins of 6 to 8, their expected behaviour is that they will bind to cation exchangers at pH 3 to 7, but will not bind to anion exchangers. Indeed, immunoglobulins are the most difficult of whey proteins to bind to an anion exchanger.

In keeping with this teaching, EP Patent No. 0320 152 discloses a process for producing a whey protein concentrate enriched in immunoglobulins by contacting an anion exchanger with whey or whey protein concentrate at pH 5.5 to 7.0 preferably pH 6.0 to 6.4. After contact with the exchanger, the unadsorbed protein fraction (effluent) contained a higher proportion of immunoglobulins than the original whey or concentrate as a result of the preferential adsorption of the other major whey proteins.

It should also be noted that when sweet whey is used in the anion exchange process of EP 0 320 152 glycomacropeptide (GMP) can be adsorbed along with the major whey proteins (as long as sufficient capacity is available), so the presence of GMP does not significantly affect the level of immunoglobulin enrichment.

It would be useful to have available an alternate process for producing an immunoglobulin enriched effluent using a cation exchanger.

Also consistent with this teaching are Japanese Patent No. 2104533 and British Patent No. 2179947 which describe processes wherein whey protein solutions are contacted with cation exchangers in the pH range 5–8 such that immunoglobulin is preferentially extracted by, and recovered in high purity from the ion exchanger. The utility of cation exchangers to adsorb immunoglobulins is further identified in GB 1,563,990 and FR 2,452,881. These patents reflect the teachings in the art that cation exchangers are used to adsorb immunoglobulins.

In other published work with cation exchangers, where contact with whey is made at lower pH e.g. 3–4.5, it has been reported that the protein mixture called whey protein isolate (WPI), recovered from the cation exchanger contains the major whey proteins β-lactoglobulin, α-lactalbumin, BSA and immunoglobulins in the same ratio as in the whey from which it was made. (Howell et al. Dairy Products Technical Conference, 1990, pages 117–128, Wisconsin Centre for Dairy Research, Madison). Clearly immunoglobulins are usually adsorbed by the cation exchanger used to manufacture WPI.

All this is in keeping with the expected behaviour of whey proteins with ion exchangers as set out in Table 1. In particular immunoglobulins do not bind easily to anion exchangers and so can be recovered at elevated levels from the effluent (breakthrough fraction). With cation exchangers they are usually adsorbed and recovered from the ion exchanger with or without other proteins depending on the conditions used.

An exception to this is a report by A D A Kanekanian and M J Lewis (in Developments in Food Proteins, (B J F Hudson, Ed.) vol. 4, pages 135–173, Elsivier, London 1986) that CM Cellulose adsorbed all the β-lactoglobulin, α-lactalbumin and BSA from demineralised whey, at pH 3, but not the immunoglobulin fraction. However, the conditions identified either are not specified in detail although they do indicate an under loading of the cation exchanger with adsorbable protein. Further, the reference teaches that ion-exchange processes are mainly useful for solutions containing low concentrations of proteins (less than 1%) and that column ion-exchange systems using both an anion and cation exchanger are preferred for use, the anion exchanger to bind most of the whey proteins and the cation exchanger to bind the immunoglobulin.

Further, U.S. Pat. No. 4,834,994 discloses a method of removing β-lactoglobulin selectively from whey by adsorption onto CM Cellulose under very specific conditions of pH 4.3–4.6, 60–90% demineralisation and a protein concentration of 0.5 to 1.5%. The authors point out that the whey breakthrough stream has an increased ratio of α-lactalbumin to β-lactoglobulin, because of the preferential adsorption and removal of β-lactoglobulin. The recovered β-lactoglobulin was reported as containing almost no immunoglobulin. The authors report that CM cellulose is not porous enough to bind immunoglobulin. However the applicants have shown otherwise in Example 9.

Neither this patent nor the Lewis reference make any mention of the possibility of producing a breakthrough fraction with enriched levels of imununoglobulins. Furthermore, their methods may be limited to their conditions of use.

NZ Patent No. 241328 also discloses a method of removing β-lactoglobulin from whey and more particularly producing an α-lactalbumin enriched cation exchanger-passed solution (breakthrough) at a non-specified temperature and under specific conditions which include a lengthy contact time of 20 hours (see Example 1).

No mention is made of whether the immunoglobulin finishes up with the β-lactoglobulin or in the α-lactalbumin enriched stream. The latter would make it enriched also in immunoglobulin. It cannot be assumed that if α-lactalbumin does not neither will immunoglobulin. In fact, the opposite might be assumed on the basis of Table 1, that the immunoglobulin would bind with the β-lactoglobulin. The applicants have shown (comparative Example 2) that under the conditions disclosed to produce an α-lactalbumim enriched stream from whey, the immunoglobulin is spread into both products and that the level of enrichment and yield is not useful.

What the applicants have now surprisingly found is that for cation exchangers, which normally adsorb immunoglobulin from whey, it is possible to reduce or prevent this adsorption taking place by contacting them with an excess of adsorbable protein. Under such conditions they have found that the immunoglobulin has difficulty binding and can be recovered as a breakthrough solution whose protein content is enriched in immunoglobulin.

This is particularly so when the whey protein solution used has a higher protein concentration than that found in whey such as an ultrafiltration retentate or reconstituted WPC. The use of such concentrated solutions has the added advantage of making it easier to contact an excess of adsorbable protein with the cation exchanger and to allow shorter contact times.

The net result of this is a process with a high yield of immunoglobulin in the WPC and a significant level of enrichment.

It is therefore an object of the present invention to provide a process for producing an immunoglobulin enriched fraction from whey protein solutions which goes some way towards achieving these desiderata, or to at least provide the public with a useful choice.

SUMMARY OF THE INVENTION

In a first aspect, the present invention provides a process for producing an inmunoglobulin enriched whey protein fraction and optionally a whey protein isolate (WPI), which process comprises:

(a) subjecting a whey protein solution to ion exchange using a cation exchanger at pH 2.5–4.5 under conditions which overload the cation exchanger with potentially adsorbable protein and which cause the exchanger to adsorb preferentially whey proteins other than immunoglobulin, (b) recovering the breakthrough whey protein fraction not adsorbed by said ion exchange step (a); and optionally (c) eluting and recovering WPI adsorbed to said cation exchanger.

In a further embodiment, the present invention may be broadly said to consist in an immunoglobulin enriched whey protein fraction whenever prepared by a process of the invention.

For the purposes of this specification the expression "to overload" means to load an ion exchanger with a quantity of potentially adsorbable protein in excess of that which the ion exchanger is able to adsorb. This results in less than the maximum yield of adsorbable protein.

BRIEF DESCRIPTION OF THE DRAWINGS

The present invention will now be described in more detail with reference to the accompanying drawings in which.

DESCRIPTION OF THE INVENTION

Figure 1:
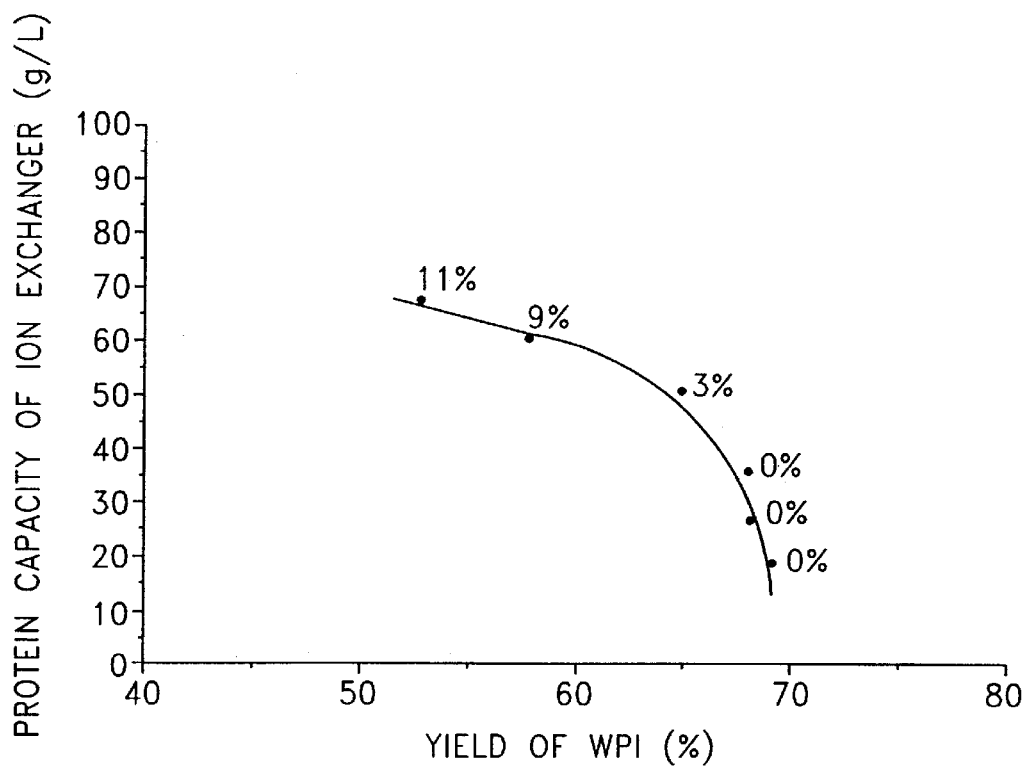
FIG. 1 is a plot of protein capacity of ion exchanger against yield of WPI showing the varying immunoglobulin G contents (% of protein) of a deproteinated UF retentate of a cheese whey stream at VCF 2.5 and the maximum yield possible for WPI.

The present invention relates to a process for producing an immunoglobulin enriched fraction from a whey protein solution.

The applicants have surprisingly found that for cation exchangers which normally adsorb immunoglobulin from whey, it is possible to reduce or prevent this absorption taking place by contacting the cation exchanger with an excess of adsorbable protein that is, overloading the ion exchanger. Generally, a pH level below about 4.5 has been found to be advantageous. It is these findings by the applicants which form the basis for the present invention.

In one aspect, as defined above, the present invention provides a process for producing an immunoglobulin enriched protein fraction and optionally a whey protein isolate (WPI) from a whey protein solution. The process involves the step (a) subjecting a whey protein solution to ion exchange using a cation exchanger under conditions which overload the cation exchanger with potentially adsorbable protein and which cause the exchanger to adsorb preferentially whey proteins other than immunoglobulin.

The solution is contacted with the ion exchanger at a pH, temperature, and for a time which are sufficient to enable the whey proteins other than immunoglobulin to be adsorbed onto the ion exchanger. This step is followed by the step of recovering the breakthrough whey protein fraction not adsorbed by the ion exchange step, and optionally the recovery of WPI adsorbed by the ion exchanger.

Whey protein solutions suitable for use in step (a) of the process of the invention include ultrafiltration retentate prepared from either sweet wheys or acid wheys, and reconstituted whey protein concentrates. Concentrates may be prepared by ultrafiltration process known in the art. The whey protein solution may also be desalted by diafiltration and/or ion exchange using an ion exchanger under conditions which does not adsorb immunoglobulin.

If desired defatting may also be effected using known separating, centrifuging or clarifying techniques.

A further optional pre-step is also possible and preferred for sweet whey protein solutions. Removal of GMP from sweet whey further increases the immunoglobulin level.

GMP may be removed in a pre-step by ultrafiltration as pH ≦4 as taught in the art for example, in EP 393,850 to produce GMP reduced retentate which is then used in the process of the present invention.

Alternatively, GMP may be removed in a pre-step by adjusting the pH of the whey or retentate from 6 to 4.6–5.0 and contacting it with an anion exchanger to selectively bind GMP as taught in the art, for example in GB 2,188,526. The pH is then further adjusted to from 2.5 to 4.5 and used in the process of the present invention. pH adjustments may be effected by the addition of suitable acids such as hydrochloric acid, sulphuric acid, lactic acid, citric acid and acetic acid.

More preferably acid whey protein solution is used in the process of the present invention. Acid wheys do not have GMP in them to be left behind in the breakthrough stream and thereby dilute the immunoglobulin. Consequently, the immunoglobulin content of the breakthrough is much higher at 20–30% of residual protein compared with that obtained from sweet wheys.

It is desirable that the whey protein solution is concentrated to produce a retentate. The process of the invention proved more effective with a retentate than whey as illustrated in Table 2. A retentate can be achieved by subjecting the selected whey solution to ultrafiltration to achieve a volume concentration factor of from 2.5 to 25. This ultrafiltration may optionally be followed by diafiltration. Suitable conditions and examples of ultrafiltration and diafiltration will be known to those skilled in the art. For example, an ultrafiltration membrane with a nominal molecular weight cut off in the range of from 5,000 Da to about 50,000 Da, more preferably 10,000 Da may be used.

Alternatively, a whey protein concentrate (WPC powder) may be reconstituted with an appropriate quantity of water to achieve the desired volume concentration factor.

Further adjustments may be made including dilution with water, pH adjustments using acid, and reduction in ionic strength by H$^+$ ion exchange with an ion exchanger (such as DOWEX™ 50W-X8 (H$^+$) resin) which does not adsorb protein. Generally, the lower the ionic strength the greater the protein concentration that can be used. The reader's attention is directed to our related specification PCT/NZ97/00005 (incorporated herein by reference) for a more comprehensive discussion on protein concentrations.

As specified above, the ion exchange step in the process of the present invention is effected using a cation exchanger. The cation exchanger used in the process of the invention may be selected from suitable inorganic and organic cation exchangers known in the art. Preferably, the cation exchanger selected is an organic cellulose base cation exchanger. More preferably, the cellulose cation exchanger is a cation exchanger prepared from regenerated cellulose as disclosed in U.S. Pat. No. 4,175,183.

Suitable cellulose cation exchangers include CM, SP and SE exchangers. Generally, a strong acid type cation exchanger such as a sulphonic acid (for example, SP or SE) exchanger is preferred.

An SP cellulose cation exchanger, such as SP GIBCO-CEL™ HG2, is particularly preferred.

The ion exchange process of the present invention is carried out under conditions which cause the cation exchanger to preferentially adsorb whey proteins other than immunoglobulin. It is not intended by this expression that the sum total of all whey proteins other than immunglobulin will be adsorbed.

The main proteins found in bovine whey and ion exchange conditions traditionally considered useful for their recovery are detailed in Table 1 above. It will be appreciated from this table that the conditions impacting on the adsorption of protein by the ion exchanger include pH, and as the applicants have found, the amount of adsorbable protein applied to the ion exchanger.

The overload conditions in process step (a) are preferably achieved by increasing the ratio of the weight of whey protein in solution to the volume of cation exchanger used so as to achieve a yield of WPI which is less than the maximum yield of adsorbable protein.

Preferably said yield is about 40 to 60% of total protein for sweet wheys and about 50 to 80% of total protein for acid wheys.

Alternatively, said yield is up to about 40% of total protein less than the maximum yield possible.

Viewed in another way, the ion exchanger is overloaded by supplying a quantity of adsorbable protein in excess of that which gives the maximum yield of adsorbed protein. The maximum yield can be readily determined by profiling adsorption according to the techniques demonstrated in the following examples.

The pH at which the process step (a) is conducted is also critical. The pH range of 2.5 to 4.5 is selected. A preferred pH range is 3.0 to 4.2. The applicants have found that over this pH range the whey proteins α-Lactoglobulin (α-LA), β-lactoglobulin (β-LG) and bovine serum albumin (BSA) are adsorbed in preference to immunoglobulin when the cation exchanger is overloaded with adsorbable protein.

The temperature at which the process is conducted may range from about 5° C. to about 50° C., preferably less than 20° C. and most preferably from 8° C. to 15° C. The lower temperatures are preferred to minimise the growth of mesophilic bacteria and to prevent protein denaturation especially of the immunoglobulin.

The step of contacting the whey solution with the ion exchanger can be carried out in any convenient manner. While contact in a column exchanger is feasible, a stirred bed of ion exchanger is preferred for use in the present invention.

Contact time with the ion exchanger may range from about 30 minutes up to 90 minutes at 10° C. Prior art processes using dilute protein solutions as found in whey such as that in NZ 241328, teach adsorption times of up to 20 hours. The present applicants teach significantly reduced contact times, particularly where concentrated whey protein solutions with reduced ionic strength are used.

In step (b) of the process of the invention the breakthrough whey protein fraction, not adsorbed by the ion exchange step (a), is recovered. Recovery may be effected according to any suitable process known in the art. For example, neutralisation, followed by ultrafiltration and/or diafiltration. Further processing steps of evaporation and freeze-drying or spray-drying may also be effected if a dry product is required.

In a preferred process step (b), the breakthrough is first neutralised to between pH 6 and 7. Neutralisation can be effected by addition of a suitable base such as sodium or potassium hydroxide. Concentration of the product is then effected by ultrafiltration. The resulting retentate may then be further neutralised if required. Desirably, the retentate is then spray dried to give an immunoglobulin enriched WPC powder.

Step (c) of the process of the invention provides for the elution and recovery of the WPI from the cation exchanger. Although not essential, it is usually desirable from an economic point of view to recover both the adsorbed protein and the breakthrough protein. The adsorbed protein (WPI) may be recovered according to elution, ultrafiltration, and drying, techniques as known in the art and outlined herein.

In the presently preferred process, the ion exchanger with adsorbed protein is washed with water and the protein eluted by a pH shift to 9 by addition of a base such as sodium hydroxide. This pH shift is accomplished preferably in a stirred slurry of water and exchanger. Elution is desirably carried for between 30 minutes and 3 hours, most preferably 1 hour at 10° C. However, a temperature range between 5° C. and 50° C. may be employed if desired. The eluate is then drained and the resin again washed with water. This eluate solution is then desirably ultrafiltrated and spray dried to give a WPI powder depleted in immunoglobulin.

In a further embodiment, the present invention also provides a whey protein fraction enriched in immunoglobulin whenever prepared by a process of the invention. Also forming a part of the invention is the whey protein solution depleted in immunoglobulin as produced by a process of the invention. As discussed above, the products may be in the form of a breakthrough solution and eluted protein solution respectively, or may be further processed to provide dry powder products.

The products as produced by the present invention have applications in nutritional and pharmaceutical products. The immunoglobulin enriched fraction may be further formulated into feedstuffs and particularly animal feedstuffs. The immunoglobulin content may provide temporary passive immunity as well as initiating the active immune system in newborns. This can increase disease resistance and increase growth rates.

The uses for the WPI product are well documented in the art. They include preparation of foodstuffs, nutritional products, and drinks and dietary supplements.

EXAMPLES

The following examples are intended to be illustrative only and in no way limit the scope of the present invention.

Example 1
Comparative Example

Cheese whey derived from a cheddar cheesemaking process was adjusted to pH 3.5 with 2 M sulphuric acid. A 320 mL sample of this was mixed with 50 mL of cation exchanger (SG GIBCOCEL™ HG2 cellulose manufactured by Life Technologies Ltd, New Zealand, Gibco BRL)[1] for one hour at 25° C. and then filtered on a sintered glass filter. The ion exchanger was washed with water and the combined breakthrough of filtrate and washings was made up to 450 mL. The breakthrough solution thus obtained was analysed for true protein by Kjeldahl nitrogen analyses and for immunoglobulin G by FPLC using a Protein G column. Sixty-eight percent of the total protein and all of the immunoglobulin G was found to have been removed by the cation exchanger. These proteins were recovered from the ion exchanger by elution at pH 9 to give a whey protein isolate containing 8% immunoglobulin G.

[1] SP GIBCOCEL™ cellulose cation exchanger has a settled volume of 1.4 mL/g of washed and drained product. It was previously known as "Indion S".

Example 2
Comparative Example

Cheese whey was adjusted to pH 3.5 with 2 M sulphuric acid. Samples (350 mL) were mixed with 17, 21, 28 and 42 mL lots of cation exchanger (SP GiboCel™ HG2) for one hour at 20° C. which maintaining the pH at 3.5 by the further addition of 2 M sulphuric acid. The cation exchanger was then collected on a sintered glass filter and washed with water. The filtrate and washings were collected and made up to 400 mL. This breakthrough solution was analysed as in Example 1. The starting whey was similarly analysed. The results are shown in Table 2. Under these conditions with whey, the immunoglobulin G in the deproteinised whey stream (breakthrough) does not increase usefully above that present in the original whey even when the cation exchanger was contacted with a large excess of protein (146 mg/mL) such that the adsorbed protein only amounted to 43% of the total present.

TABLE 2

Adsorption of Protein from Whey by SP GIBCOCEL ™ Cellulose Cation Exchanger

| | Volume of SP GIBCOCEL ™ Cellulose Cation Exchanger Used, mL | | | |
|---|---|---|---|---|
| | 17 | 21 | 28 | 42 |
| Whey* used, g | 350 | 350 | 350 | 350 |
| Protein load, mg/mL of SP | 146 | 117 | 87 | 58 |
| IgG Yield in Breakthrough, % | 65 | 65 | 58 | 41 |
| IgG/Protein in Breakthrough, % | 6.1 | 7.1 | 7.2 | 5.8 |

*Whey: 0.70% protein and 5.4% IgG/Protein

Cheese whey was concentrated two and a half times by ultrafiltration. This retentate with a volume concentration factor of 2.5 (VCF 2.5) was adjusted to pH 3.5 with 2 M sulphuric acid and 114 g samples of it were mixed with SP GIBCOCEL™ HG2 cellulose cation exchanger using 50, 38, 25, 19 and 15 mL lots. After mixing for one hour at 25° C. the SP GIBCOCEL™ cellulose cation exchanger was collected on a sintered glass filter, drained and washed with water. The combined filtrate and washings were made up to a volume of 175 mL and analysed as described in Example 1.

FIG. 1 shows the maximum yield of WPI as being 68–70% (from this particular UF retentate from cheese whey) no matter how much ion exchanger is used to bind the protein. Under these conditions the immunoglobulin G is also adsorbed and appears in the WPI product.

FIG. 1 also shows how the immunoglobulin G content of the protein in the breakthrough solution from the ion exchanger increases as the yield of WPI is decreased. The operating capacity of the cation exchanger increases under these conditions. When the yield was limited to 50% there was an increase in the immunoglobulin G content of the retentate to 11%, based on total protein, as compared with 6% in the feed to the ion exchanger. Further concentration of this exchanger breakthrough solution by ultrafiltration gave an 80% protein WPC which analysed as having an immunloglobulin G content of 10% of total solids.

Recovery of the protein from the SP GIBCOCEL™ cellulose cation exchanger by elution at pH 9 gave a WPI with less than 2% immunoglobulin G.

A WPC powder (80% protein) obtained from sulphuric acid casein whey was reconstituted to give a 5.5% protein solution corresponding to a VCF 10 retentate from ultrafiltration of whey. The pH of this was adjusted to 3.8 with 2 M sulphuric acid and 20 mL amounts were mixed with 20, 13.3 and 10 mL lots of SP GIBCOCEL™ cellulose cation exchanger HG2 for 30 minutes at about 10° C. while maintaining the pH at 3.8. The exchanger was then collected on a sintered glass filter, drained and washed with water. The combined filtrate and washings were made up to a volume of 50 mL and analysed as described in Example 1.

Figure 2:
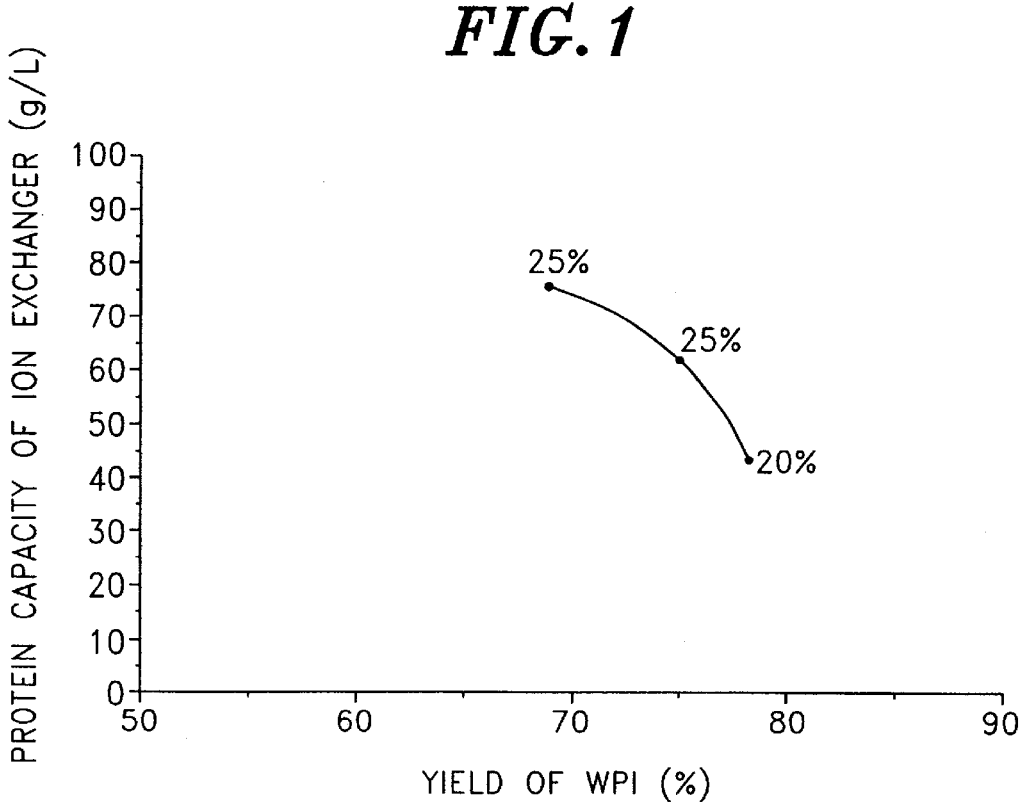
FIG. 2 is a plot as in FIG. 1 but of deproteinated WPC obtained initially from $H_2SO_4$ casein whey.

The results are presented in Table 3 and FIG. 2 and show that the maximum WPI yield is around 80% of total protein, when the SP GIBCOCEL™ cellulose cation exchanger is loaded with less than 55 g/L. By doubling the load, the yield of WPI decreases to around 70% but:

(i) the operating capacity of the SP resin improves dramatically and hence the cost of WPI production is reduced.
(ii) the recovery of immunoglobulin G in the breakthrough improves dramatically and likewise its cost of production.
(iii) the immunoglobulin G content of the WPC stream is increased to 25% of protein present. This is significantly greater than the 9% found in the original WPC from sulplhturic acid casein whey.

By overloading the ion exchanger with protein to decrease the yield of WPI from about 80% to about 70%, and co-producing two products, we obtained these advantages.

TABLE 3

Conditions for Co-producing WPI and IgG-Enriched WPC from Acid Whey Retentate

| Load Ratio[1] | Protein Load g/L[2] | SP Capacity g/L[2] | WPI Yield %[3] | Immunoglobulin G[4] Yield % | Purity % |
|---|---|---|---|---|---|
| 1:1 | 55 | 43 | 78 | 55 | 20 |
| 1:1.5 | 83 | 62 | 75 | 69 | 25 |
| 1:2 | 110 | 76 | 69 | 84 | 25 |

[1]Ratio (v/v) of SP GIBCOCEL ™ cellulose cation exchanger; VCF 10 retentate
[2]g of protein per liter of SP GIBCOCEL ™ cellulose cation exchanger
[3]% of the total proteins in the retentate
[4]IgG remaining in the breakthrough stream.

Example 5

Figure 3:
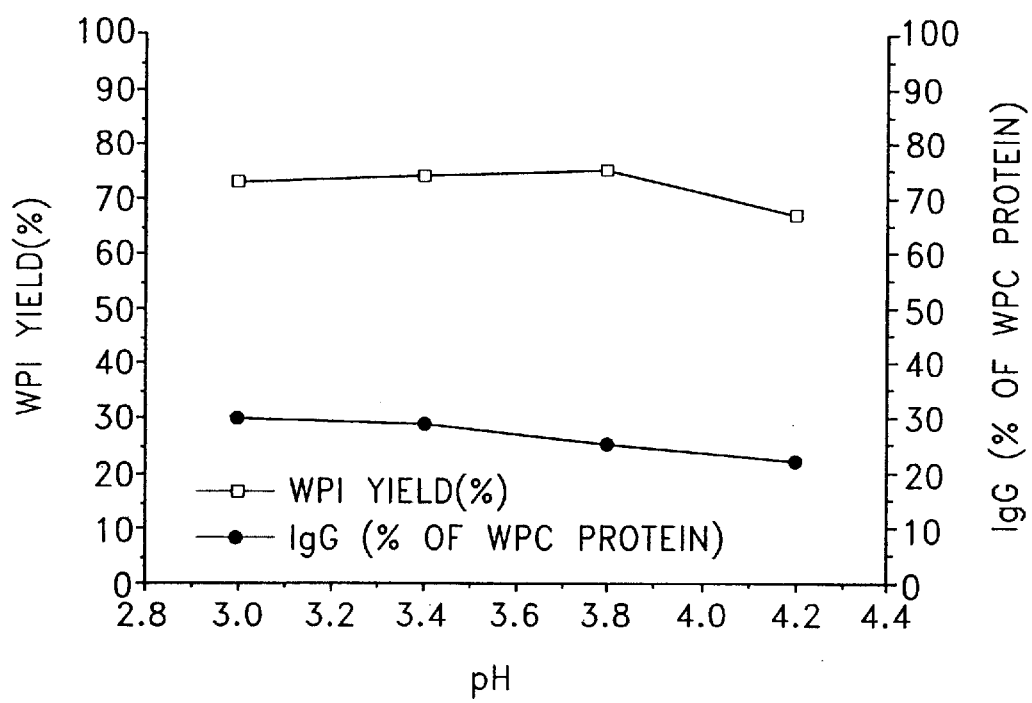
FIG. 3 is a plot of WPI yield and immunoglobulin G content of WPC as a percentage of WPC protein against pH.

This was the same as Example 5 except that the pH was varied from 3 to 4.2 using 20 mL of reconstituted WPC at 5.5% protein and mixing it with 13.3 mL of SP GIBCOCEL™ cellulose cation exchanger. The yield of WPI and immunoglobulin G content of the residual protein in the breakthrough streams are shown in FIG. 3 which shows that it was possible to produce an immunoglobulin G enriched WPC stream across the pH range 3.0 to 4.2.

Example 6

Figure 4:
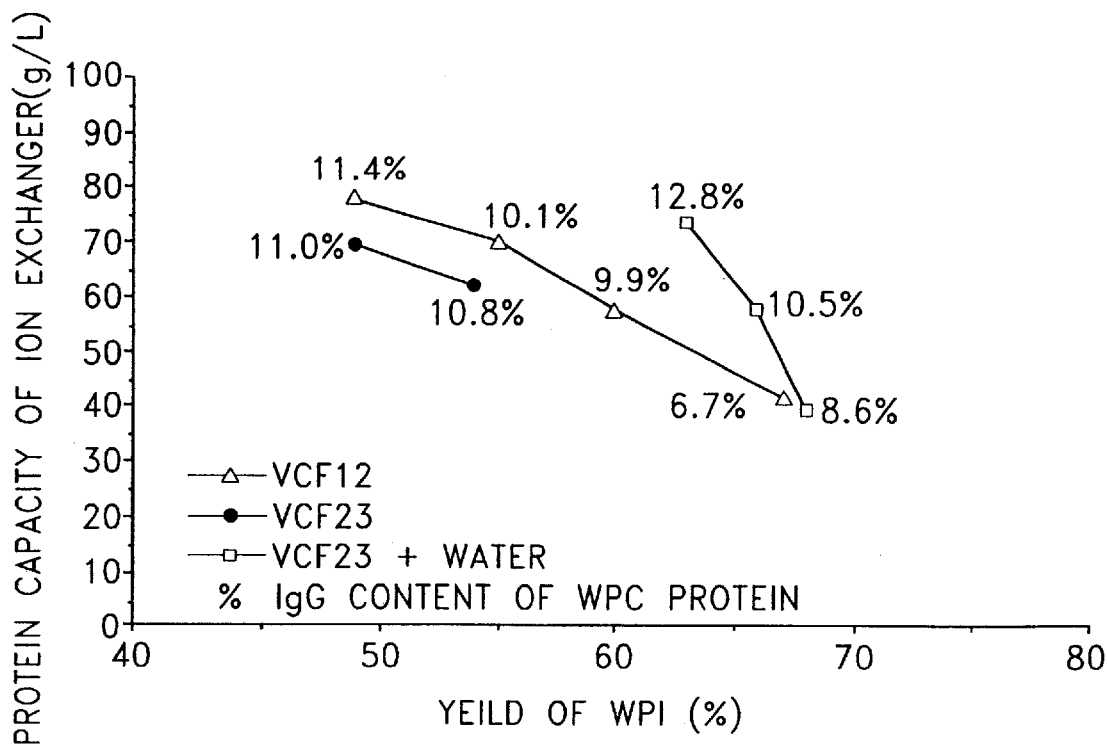
FIG. 4 is a plot similar to that of FIG. 1 and FIG. 2 showing the effect of VCF and dilution of retentate on the performance of ion exchanger.

The same batch of cheese whey as used in Example 2 was concentrated by ultrafiltration to give retentates with volume concentration factors (VCF) of about 12 and 23. These were used in place of whey as in Example 2. The amount of retentate applied to the SP GIBCOCEL™ cellulose cation exchanger was correspondingly reduced to 28 and 15 g respectively so that the total amount of protein presented to each lot of ion exchanger remained constant. In addition the VCF23 retentate was diluted with twice its weight of water and 45 g used. Table 4 summarizes the conditions used and shows the yield and content of imunoglobulin G in the non-adsorbed protein in the WPC stream. FIG. 4 shows the effect of WPI yield and operating capacity of the ion exchange on this immunoglobulin G level.

TABLE 4

Absorption of Protein from Various Cheese Whey Retentates

| | VCF12 | VCF23 | VCF23 & H₂O |
|---|---|---|---|
| Protein Conc, % | 9.11 | 15.1 | 35.2 |
| IgG/Protein, % | 6.3 | 67 | 6.7 |
| Weight used, g | 28 | 15 | 45 |

TABLE 4-continued

Absorption of Protein from Various Cheese Whey Retentates

| | VCF12 | | | VCF23 | | | VCF23 & H₂O | | |
|---|---|---|---|---|---|---|---|---|---|
| SP GibcoCel ™, mL | 17 | 21 | 28 | 42 | 17 | 21 | 21 | 28 | 42 |
| Protein load, mg/mL SP | 150 | 121 | 91 | 61 | 133 | 108 | 111 | 84 | 56 |
| IgG yield in WPC, % | 93 | 72 | 63 | 36 | 85 | 74 | 71 | 53 | 41 |
| IgG/Protein, % | 11.4 | 10.1 | 9.9 | 6.7 | 11.0 | 10.8 | 12.8 | 10.5 | 8.6 |

Example 7

Twenty kg of WPC powder containing 80% protein (sold under the trade name ALACEN 392) manufactured from cheese whey was reconstituted at 20% total solids and its pH was adjusted to pH 3.75 with 10% sulphuric acid. This solution was mixed for 40 minutes at 10° C. with 130 L of SP GIBCOCEL™ HG2 cellulose cation exchange resin that was previously flooded with water. This mixing was carried out in a 500 L tank fitted with a screen across the bottom. At the end of the mixing period the resin was drained and washed with 100 L of water.

The breakthrough and washings (335 L at 2.2% protein) were adjusted to pH 6.2 with sodium hydroxide and concentrated to 16% total solids by ultrafiltration on Koch HFK 131 membranes. The resulting letentate was further neutralised and spray dried to give an Ig-enriched WPC powder. The immunoreactive Immunoglobulin G content of this powder (as determined by the radial immune diffusion method, Binding Site assay kit, Binding Site Ltd, Birminghain, UK), was 14.3% Kjeldahl protein as compared with an IgG level of 8.8% of protein in the original cheese WPC.

The adsorbed protein was recovered from the washed and drained resin by adding one bed volume of water and then mixing for one hour at 10° C. at pH 8.0 by the addition of sodium hydroxide. The elute was then drained from the vessel and the resin was washed with approximately a bed volume of water to give 290 L of elute at 2.7% protein. The elute solution was ultrafiltered and spray dried to give a whey protein isolate powder with an IgG content of only 3.2% of protein.

Example 8

Seventeen kg of a WPC powder containing approximately 80% protein (sold under the trade name ALACEN 134) manufactured from acid casein whey was reconstituted at 20% total solids and its pH was adjusted to pH 3.75 with 10% sulphuric acid. This solution was mixed with a cation exchanger under the same conditions as for Example 7.

The breakthrough and washings (330 l at 1.3% protein) were adjusted to pH 6.2 with sodium hydroxide and concentrated to 15% total solids by ultrafiltration on Koch HFK 131 membranes. The resulting retentate was further neutralised and freeze dried to give an Ig-ennrched WPC powder. The immunoreactive Immunoglobulin G content of this powder (as determined by RID) was 23.9% of Kjeldahl protein as compared with an IgG level of 10.4% of protein in the original WPC.

WPC powder as used in Example 7 was reconstituted at 9% total solids and its pH adjusted to pH 3.8 with 10% sulphuric acid. This solution (30 g) was mixed for 30 minutes at 10° C. with 25.6 g (31 mL) of the CM cellulose, WHATMAN CM52™ in the sodium ion form, which had been washed with water and drained under vacuum on a sintered glass filter. The pH was maintained at 3.8 during this time and then the CM cellulose was collected on the filter, drained and washed with water. The combined filtrate and washings (breakthrough) was then analysed for protein and immunoglobulin G as described in Example 1. The reconstituted WPC solution was similarly analysed. It was found that 52% of the immunoglobulin G had been adsorbed by the CM cellulose.

Industrial Application

It is believed that the process of the present invention for producing an immunoglobulin enriched fraction from a protein solution will find widespread acceptance in the dairy industry. The process is effective using concentrated whey protein solutions, enabling lower batch volumes and shorter contact times with the cation exchanger. More generally, the collection of two useful fractions at the same time has benefits of both reducing plant effluent produced and providing better economics of scale. The process is also a useful alternative to methods of collecting immunoglobulin enriched fractions as a WPI.

The immunoglobulin enriched products produced by the process of the invention have utility in nutritional and pharmaceutical products, particularly animal feedstuffs. Feedstuffs with increased immunoglobulin content may provide temporary passive immunity to an animal as well as initiating the active immune system in newborns. This increases disease resistance and increases growth rates.

It will be appreciated by those persons skilled in the art although the present invention has been described with reference to specific embodiments, modifications and alterations of the embodiments described can be made without departing from the scope of the invention.

What is claimed is:

1. A process for producing an immunoglobulin enriched whey protein fraction and optionally a whey protein isolate (WPI), which process comprises:
   (a) subjecting a 1× to 23× concentrated whey protein solution at a pH of 3.0 to 4.2 and at a temperature of 10° C. to 25° C. to conditions under which a sulfopropyl (SP) cation exchanger is overloaded with potentially adsorbable protein and which cause the exchanger to adsorb whey proteins other than immunoglobulins;
   (b) recovering the whey protein fraction not adsorbed by said ion exchange step (a); and
   (c) optionally eluting and recovering the WPI absorbed to said cation exchanger.

2. A process as claimed in claim 1 wherein the WPI is eluted and recovered.

3. A process as claimed in claim 1 wherein the whey protein solution is an ultrafiltration retentate.

4. A process as claimed in claim 3 wherein the ultrafiltration retentate has a volume concentration factor of 10 or 23.

5. A process as claimed in claim 3 wherein the whey protein solution or retentate is reduced in ionic strength.

6. A process as claimed in claim 5 wherein the reduced ionic strength is achieved by diafiltration, dilution or $H^+$ ion exchange with an ion exchanger.

7. A process as claimed in claim 2 wherein the weight of whey protein in solution to the volume of cation exchanger used achieves a yield of whey protein isolate (WPI) which is less than the maximum yield of adsorbable protein.

8. A process as claimed in claim 7 wherein said yield is about 40% to 60% of total protein for sweet whey.

9. A process as claimed in claim 7 wherein said yield is about 50% to 80% of total protein for acid whey.

10. A process as claimed in claim 7 wherein said yield is up to about 40% of total protein less than the maximum yield possible.

11. A process as claimed in claim 1 wherein the protein solution is contacted with the cation exchanger for less than about 2 hours.

12. A process as claimed in claim 1 wherein said cation exchanger is a cellulose based cation exchanger.

13. A process as claimed in claim 12 wherein said cation exchanger is regenerated cellulose cation exchanger.

14. A process as claimed in claim 1 wherein the recovered whey protein faction is subjected to ultrafiltration and the retentate recovered.

15. A process as claimed in claim 14 wherein the retentate is spray-dried to produce a dry whey protein concentrate.

16. A process as claimed in claim 2 wherein the WPI is subjected to ultrafiltration and the retentate recovered.

17. A process as claimed in claim 16 wherein the retentate is spray-dried to produce a dry WPI concentrate.

* * * * *